Feb. 27, 1940. W. F. ALDER 2,191,434
COOLING AND MIXING VESSEL FOR BEVERAGES
Filed Oct. 10, 1939
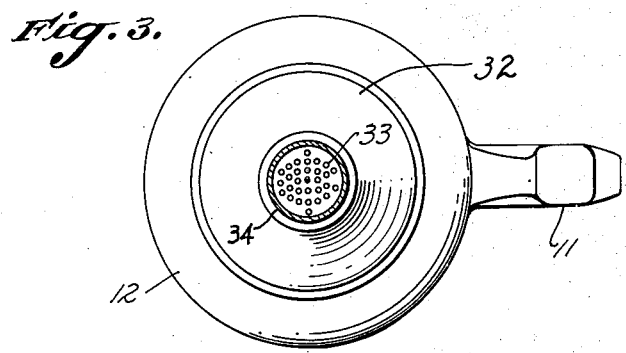
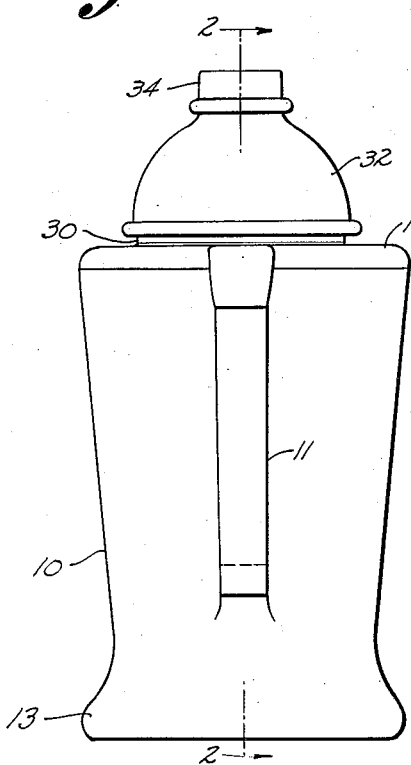
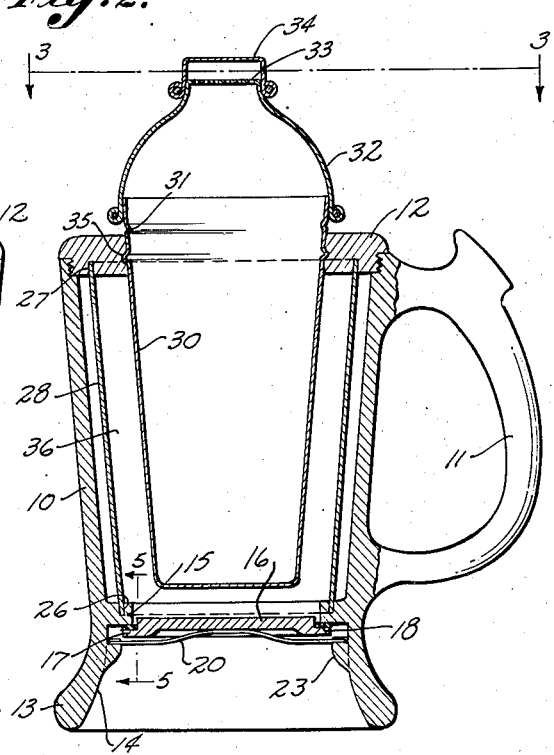
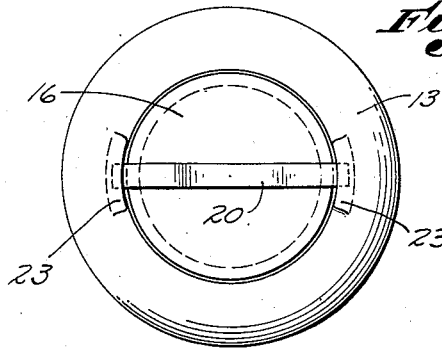
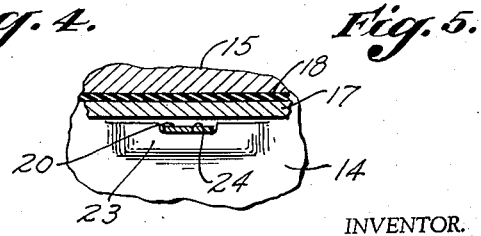
INVENTOR.
WILLIAM F. ALDER,
BY Russell M. Otis
ATTORNEY.

Patented Feb. 27, 1940

2,191,434

UNITED STATES PATENT OFFICE 2,191,434

COOLING AND MIXING VESSEL FOR BEVERAGES

William F. Alder, Altadena, Calif., assignor to Jenness A. Alder, Altadena, Calif.

Application October 10, 1939, Serial No. 298,787

6 Claims. (Cl. 62—91.5)

This invention relates to a vessel for cooling and mixing cocktails and other beverages, wherein the several ingredients are mixed and cooled to the desired temperature.

Ordinarily, in the mixing of cool drinks the several ingredients are placed in a shaker together with chopped ice or ice cubes and the whole is shaken until the mixing is complete and until the drink has been cooled to the desired degree. A disadvantage of this procedure is that the drink is diluted to an indefinite extent by the amount of the ice which melts and mixes with the drink. This makes it impossible to prepare a drink of always the same composition and often results in destroying the delicate balance of taste which careful compounding of a drink would otherwise produce. It is an object of this invention, therefore, to provide a means whereby the drink may be mixed and cooled without the necessity of introducing ice into the drink, and without any chance of diluting the drink with melted ice.

Another object is to provide a cooling and mixing vessel in which a drink may be rapidly and conveniently cooled.

Another object is to provide a cooling and mixing vessel for beverages adapted to contain a refrigerant in heat exchange relation to, but out of direct contact with, the contained drink.

Another object of the invention is to provide a cooling vessel for beverages which is of high thermal efficiency.

Another object is to provide means for cooling a beverage which is adapted to employ solid carbon dioxide as the refrigerant and to permit escape of the evaporated gas.

Another object is to provide a vessel for cooling and mixing beverages which is adapted to contain a refrigerant and which has a base serving as a funnel for the introduction of the refrigerant when the vessel is up-ended.

Still another object is to provide a vessel for cooling and mixing beverages which is attractive in appearance, convenient and durable in use, and which is easy to manufacture.

These and other apparent objects are attained in a manner which will be clear from the following description taken in connection with the accompanying drawing, of which:

Fig. 1 is an elevational view of my vessel for cooling and mixing beverages.

Fig. 2 is a sectional elevational view of my vessel, taken along the line 2—2 of Fig. 1.

Fig. 3 is a sectional view of the cooling and mixing vessel taken along the line 3—3 of Fig. 2, as indicated.

Fig. 4 is a view of the under side of my vessel for cooling and mixing beverages.

Fig. 5 is a partial sectional view of the vessel taken along the line 5—5 of Fig. 2, as indicated.

The cooling and mixing vessel of my invention preferably comprises a housing 10 consisting preferably of a shell of frusto-conical shape having a handle 11 connected near the top and bottom thereof. The top of the shell 10 is covered by a top member 12 which is preferably screwed into the shell 10 and forms a tight joint with the shell 10. At its lower end the shell 10 terminates in a decorative base 13 which makes substantially line contact with the table or other supporting surface on which it is placed. The interior surface of the base at 14 is shaped to provide a funnel leading into the space within the shell 10 when the vessel is up-ended. At a considerable distance up from the bottom of the base 13, the shell 10 extends inwardly to provide a flange 15. A bottom closure member 16 having an under-slung peripheral portion 17 is adapted to fit into the open lower end of the shell 10 with the peripheral portion opposite the flange 15. A flexible washer 18, preferably of rubber and having a natural inner diameter less than that of the inner diameter of the peripheral portion 17, is stretched over the main body of the closure member 16 so as to lie flat on and to be resiliently retained on the peripheral portion 17 of the closure member. The closure member 16 is preferably resiliently retained in a closing position on the vessel by means of a flat spring 20 which bears on the center of the closure member and is at its ends retained against movement in any direction except toward the flange 15 by abutments 23 located at diametrically opposite points on the base 13. The abutments 23 preferably comprise portions projecting from the wall 14 to near the periphery of the closure member 16 and having slots 24 of slightly greater width than the spring 20, in such manner that the ends of the spring 20 extending beyond the periphery of the closure member 16 may be depressed and rotated into position in the slots 24. When the ends of the spring 20 are once entered into the slots 24, they are retained therein and the spring resiliently holds the washer 18 in sealing contact with the flange 15. While the closure member 16 is thus held in closing position to seal the bottom opening to the space within the shell 10, if sufficient pressure is built up within the enclosed space it acts on the interior face of the closure member 16 and forces it outwardly against the force of the spring 20, thereby opening up a passage to the atmosphere for relief of the pressure within. When a sufficient amount of the fluid under pressure within the shell 10 has escaped the spring 20 again presses the closure member 16 inwardly to press the washer 18 against the flange 15 in sealing contact therewith. In this manner the closure member 16 and associated parts act not only to close the bottom end of the shell 10 but also serve as a relief valve. The importance of the latter function will become apparent when the use of the device is hereinafter described.

The shell 10, the top member 12, and the closure member 16 are preferably made of a material which can be molded into the desired form, such as Bakelite or other synthetic resin, or glazed porcelain.

In the upper face of the inwardly extending flange 15 is preferably a groove 26 inclined to the axis of the shell 10 at about the same angle as the walls of the shell 10, and in the under face of the top member 12 is a corresponding groove 27. Assembled with its top end in the groove 27 and its bottom end in the groove 26 is a partition 28 which is preferably of sheet metal such as aluminum which is polished on both sides so as to act as a poor absorber of heat on its outer surface and as a poor radiator of heat on its inner surface. The partition 28 is preferably spaced a short distance from the shell 10 so as to provide an insulating dead air space therebetween. By this construction, only a comparatively small amount of heat is allowed to flow into the space within the partition 28 per unit of time. The partition 28 is preferably installed within the grooves 26 and 27 with cement, or varnish, or similar substance, so as to make a fluid-tight connection.

Centrally supported in the top member 12 is a tapered beverage container 30, preferably formed of sheet metal, which is spaced a considerable distance from the partition 28 and which extends downwardly to near the bottom closure member 16. The wall of the container 30 is preferably inclined to the axis at about the same angle as the partition 28. The container 30 is closed at the bottom and open at the top. When made of metal, the container 30 is preferably deformed inwardly near the top thereof to form a bead 31 for providing greater rigidity in the container 30. Should the container 30 be made of molded material such as synthetic resin or porcelain it may be molded in one piece with the top member 12 and the bead 31 may then be dispensed with. A cover 32 of the usual type is provided for the container 30 and is adapted to be held on the container by friction. The upper end of the cover 32 is preferably perforated at 33 to make a strainer, and a second cover 34 is provided for the perforated cover 32, being adapted to be retained thereon by friction.

In the embodiment disclosed, in which the container 30 is made of metal the container 30 may be deformed outwardly at 35 and the top member 12 may be molded around the container 30 so as to enclose the protuberance 35. In this manner, the container 30 and the top member 12 become, in effect, a single piece and the container is supported firmly and in a fluid-tight manner in the top member 12.

In use, the above-described cooling and mixing vessel is first turned upside down and the closure member 16 is removed. This may be done by depressing the ends of the spring 20 so as to clear the abutments 23 and then rotating the spring 20 so as to release it for removal. Removal of the closure member 16 exposes the chamber 36 between the partition 28 and the container 30. Into this space 36 is placed a refrigerant, preferably solid carbon dioxide (dry ice) or a mixture of ice and salt. In installing the refrigerant the tapered inside surface 14 of the base of the device serves as a funnel to prevent spilling of the refrigerant. The closure member 16 is then replaced and the vessel is stood on its base.

The drink to be mixed and cooled is poured into the container 30, without the ice which generally accompanies it. The covers 32 and 34 may be put in place and the whole device may be shaken for a time sufficient to thoroughly mix the drink and to bring it to the desired low temperature. Preferably, however, the drink is mixed by simply stirring with a spoon while the vessel rests on a table. Since by use of this device a refrigerant considerably colder than ice may be employed, it is found that the time required to cool the drink is very much less than in the ordinary shaker in which ice is included with the drink for cooling; and it is found that, if desired, the drink may be brought to a much lower temperature than in ordinary practice.

It will be observed that since the container 30 is in direct contact with the refrigerant and has a mat surface on its exterior, very favorable conditions are maintained for transfer of heat between the drink contained within the container 30 and the refrigerant contained in the space 36; and, because of the reflecting surfaces on both sides of the partition 28 and the air space between the partition 28 and the shell 10, poor heat transfer conditions exist between the space 36 and the atmosphere. Poor heat transfer conditions also exist between the shell 10 and the surface on which the vessel is supported, by reason of the narrow line of contact between the base 13 and the supporting surface. This means that a drink in the container 30 is rapidly cooled, but the refrigerant is only slowly heated and used up by heat coming in from the atmosphere.

When solid carbon dioxide is employed as the refrigerant in the space 36 it evaporates gradually and builds up a pressure in the space 36. When this pressure increases to the point where the outward force on the closure member 16 is sufficient to overcome the force of the spring 20 the spring deflects and permits the closure member 16 to move outwardly enough to open a passage for the discharge of gas from the space 36. As soon as enough gas has been discharged to the atmosphere to sufficiently lower the pressure in the space 36, the closure member 16 is reseated by the spring 20, and the process is repeated or an equilibrium condition establishes itself in which the closure member 16 is held off its seat by just the amount to permit escape of as much gas as is being formed, under the pressure which exists.

When the drink contained in the container 30 has been mixed and cooled, it may be poured out through the strainer 33 after removing the cap 34, or may be poured directly out of the container after removal of the cap 32. If desired, the drink may be kept cool for an indefinite period in the vessel.

It will be evident that I have provided a vessel for cooling and mixing beverages, wherein the beverage is not diluted by ice in the cooling thereof, and in which the cooling and mixing may be accomplished much faster, more efficiently, and more conveniently than with beverage shakers commonly employed. Moreover, my device is highly efficient thermally and requires a minimum of refrigerant.

It will be understood that various changes and modifications in the design and construction of the vessel of my invention may be made without departing from the spirit and scope of the appended claims.

I claim as my invention:

1. The combination of: a container for beverage; a housing surrounding said container and spaced therefrom to provide a space between said housing and said container, said housing having an opening in the bottom thereof; a heat reflecting partition between said housing and said container dividing said space into an insulating space adjacent said housing and a chamber adjacent said container adapted to contain refrigerant; and a closure member adapted to close said opening.

2. The combination of: a container for beverage; a housing surrounding said container and spaced therefrom to provide a fluid-tight space adapted to contain a refrigerant, said housing having an opening therein for introduction of refrigerant into said space; a closure member for said opening; and means resiliently holding said closure member in closed position in such manner as to form a relief valve for gas generated in said space.

3. The combination of: a container for beverage; a housing surrounding said container and spaced therefrom to provide a space between said housing and said container; a partition between said housing and said container dividing said space into an insulating space adjacent said housing and a chamber adjacent said container adapted to contain refrigerant; walls forming an opening through said housing into said chamber for introduction of said refrigerant; a closure member for said opening; and means resiliently holding said closure member in closed position in such manner as to form a relief valve for gas generated in said chamber.

4. The combination of: a container for beverage; a housing surrounding said container and spaced therefrom to provide a fluid-tight space between said housing and said container for holding a refrigerant; walls forming an opening through said housing into said space for introduction of said refrigerant; a seat adjacent said opening; a closure member for said opening adapted to rest on said seat; a flat spring bearing on said closure member and urging said member against said seat; and abutments on said housing for retaining the opposite ends of said spring.

5. The combination of: a container for beverage; a housing surrounding said container and spaced therefrom to provide a fluid-tight space between said housing and said container for holding a refrigerant; walls forming an opening through said housing into said space for introduction of said refrigerant; a seat adjacent said opening; a closure member for said opening adapted to rest on said seat; a flat spring bearing on said closure member and urging said member against said seat; and diametrically opposite abutments on said housing including slots into which the opposite ends of said spring may be rotated, the walls of said slots being adapted to retain said spring against movement in any direction except toward said seat.

6. The combination of: a housing open at the bottom; a beverage container open at the top and supported in said housing by a fluid-tight connection in such manner as to provide a space between the side walls of said housing and said container for holding refrigerant; a base on said housing extending down beyond the opening in the bottom of said housing and shaped on its interior surface to form a funnel leading into said opening when up-ended; a closure member adapted to close said opening; a flat spring bearing on said closure member and urging said member into closed position; and abutments on the interior surface of said base for retaining the opposite ends of said spring.

WILLIAM F. ALDER.